(12) United States Patent
Sukonthapanich et al.

(10) Patent No.: US 7,219,911 B2
(45) Date of Patent: May 22, 2007

(54) RETRACTABLE VEHICLE STEP ASSEMBLY

(75) Inventors: Dusit Sukonthapanich, Newmarket (CA); Ryan Herman, Aurora (CA); Tony Fabiano, Newmarket (CA); Michael Sykes, Orangeville (CA); Peter Revelis, Newmarket (CA)

(73) Assignee: Ventra Group Inc., Ontario (CA)

( * ) Notice: Subject to any disclaimer, the term of this patent is extended or adjusted under 35 U.S.C. 154(b) by 269 days.

(21) Appl. No.: 10/966,060

(22) Filed: Oct. 18, 2004

(65) Prior Publication Data

US 2006/0082096 A1    Apr. 20, 2006

(51) Int. Cl.
    *B60R 3/02*    (2006.01)
(52) U.S. Cl. ..................................... 280/166
(58) Field of Classification Search .............. 280/163, 280/166; 182/97, 127
    See application file for complete search history.

(56) References Cited

U.S. PATENT DOCUMENTS

| | | | |
|---|---|---|---|
| 3,313,374 A * | 4/1967 | Teach ..................... | 182/89 |
| 3,329,443 A * | 7/1967 | Lowder et al. ........... | 280/166 |
| 3,762,742 A * | 10/1973 | Bucklen ................. | 280/166 |
| 3,912,299 A | 10/1975 | Carr | |
| 3,980,319 A | 9/1976 | Kirkpatrick | |
| 3,986,503 A | 10/1976 | Le Guillon | |
| 4,108,458 A | 8/1978 | Owens | |
| 4,200,303 A | 4/1980 | Kelly | |
| 4,312,515 A | 1/1982 | Allori | |
| 4,462,486 A | 7/1984 | Dignan | |
| 4,753,447 A | 6/1988 | Hall | |
| 5,046,582 A * | 9/1991 | Albrecht ................. | 182/127 |
| 5,092,617 A * | 3/1992 | Jones, Jr. ................ | 280/166 |
| 5,375,864 A | 12/1994 | McDaniel | |
| 5,498,012 A | 3/1996 | McDaniel et al. | |
| 5,738,362 A | 4/1998 | Ludwick | |
| 5,897,125 A | 4/1999 | Bundy | |
| 6,036,208 A | 3/2000 | Frerichs | |
| 6,149,172 A | 11/2000 | Pascoe et al. | |
| 6,168,176 B1 | 1/2001 | Mueller | |
| 6,471,002 B1 | 10/2002 | Weinerman | |

(Continued)

FOREIGN PATENT DOCUMENTS

| | | | |
|---|---|---|---|
| EP | 1449722 A1 * | 8/2004 | |
| GB | 2066745 A * | 7/1981 | |
| WO | WO 99/37505 | 7/1999 | |

*Primary Examiner*—Frank Vanaman
(74) *Attorney, Agent, or Firm*—Pillsbury Winthrop Shaw Pittman LLP (57) ABSTRACT

A retractable step assembly for use with a vehicle includes a mounting bracket for mounting the assembly in an operative position to the vehicle, a step pivotally connected to the mounting bracket so as to pivot about a substantially vertical pivot axis, a guide member provided on the step and movably mounted to the mounting bracket, and a lock assembly. The guide member is configured to rotate about and translate axially along the pivot axis relative to the mounting bracket to allow the step to be moved between a retracted position and an extended position. The lock assembly includes a lock movable between a locked position locking the guide member against movement relative to the mounting bracket, and an unlocked position permitting the guide member to rotate about the pivot axis and translate axially along the pivot axis relative to the mounting bracket.

38 Claims, 9 Drawing Sheets

U.S. PATENT DOCUMENTS

| | | |
|---|---|---|
| 6,533,303 B1 | 3/2003 | Watson |
| 6,659,484 B2 | 12/2003 | Knodle et al. |
| 2003/0038446 A1 | 2/2003 | Anderson et al. |
| 2003/0071434 A1 | 4/2003 | Budd |
| 2003/0116938 A1 | 6/2003 | Shields et al. |
| 2003/0230867 A1 | 12/2003 | Brockway |

* cited by examiner

RETRACTABLE VEHICLE STEP ASSEMBLY

BACKGROUND OF THE INVENTION

1. Field of the Invention

The present invention relates to a retractable step assembly that may be mounted to a vehicle.

2. Description of Related Art

Steps that are stowable, or retractable, on vehicles have been developed to aid a person to access parts of the vehicle that would otherwise be difficult to access. Designs to achieve this stowability are numerous, but may be characterized by a small number of articulated motions, including rectilinear and rotational. Steps that move rectilinearly between the stowed and deployed positions operate much like drawers in a cabinet, as disclosed in, for example, U.S. Pat. No. 6,036,208. To deploy the step, the user pulls one end of the step out from the vehicle. To store the step, the user pushes the step in towards the vehicle until it is stowed. This type of step requires the balancing of mounting the step high enough so that the step provides adequate ground clearance, yet low enough so a user of an average height may easily use the step when it is deployed.

Steps that move rotationally typically rotate about either a substantially horizontal axis or a substantially vertical axis. Steps that pivot about a substantially horizontal axis, as disclosed in, for example, U.S. Pat. No. 4,462,486, operate like a tailgate of a pick-up truck. When the user wants to deploy the step, user pulls the step down to a substantially horizontal position. To store the step, the user rotates the step to a non-horizontal, typically substantially vertical, position. Like the steps that move rectilinearly, as described above, these steps should also be carefully mounted on the vehicle.

Steps that rotate about a substantially vertical axis, as disclosed in, for example, U.S. Pat. No. 5,897,125, are typically stored in a position beneath a part of the vehicle, and are rotated to be deployed in a position away from the vehicle. Again, these steps should be carefully mounted so that sufficient ground clearance is provided, as well as an easy to use height.

U.S. Pat. No. 4,312,515 discloses a step that moves both rotationally about and rectilinearly along a substantially vertical axis when it is moved between the stowed and deployed positions. A slot that is substantially vertical is used to "lock" the step in a deployed position. A cam slot that is disposed at an angle from the vertical axis defines the motion of the step when it moves into the stowed position. This motion is both rotational and rectilinear, as movement of a pin that is operatively connected to the step along the cam slot causes the step to rotate about the vertical axis and translate along the vertical axis. This cam slot is used to "lock" the step in the stowed position. To move the step from the stowed position, the user lifts and rotates the step until the pin reaches the top of the vertical slot, then allows gravity to act on the step, and, hence, the pin moves down the vertical slot and into the "locked" deployed position. To stow the step, the user lifts the step so that the pin moves out of the vertical slot, then rotates the step away from the vertical slot. Again, gravity will act on the step and allow the pin to move to the bottom of the cam slot, thereby "locking" the step in the stowed position.

None of the aforementioned examples have mechanisms that are protected from adverse environmental conditions. In each of these examples, the mechanisms that provide the motion, as well as any locking structure, are exposed to the environment, which may cause the mechanisms to get wet and dirty, thereby subjecting them to potential corrosion and/or mechanical malfunctions.

SUMMARY OF THE INVENTION

One aspect of the invention provides a retractable step assembly for use with a vehicle. The step assembly includes a mounting bracket for mounting the step assembly in an operative position to the vehicle, and a step pivotally connected to the mounting bracket so as to pivot about a substantially vertical pivot axis when the step assembly is in the operative position. The step has a top surface configured to receive a person's foot. The assembly also includes a guide member that is provided on the step and movably mounted to the mounting bracket to rotate about the pivot axis and translate axially along the pivot axis relative to the mounting bracket to allow the step to be moved between a retracted position and an extended position. A lock assembly is constructed and arranged to lock the guide member and the step in the retracted position. The lock assembly includes a lock movable between (a) a locked position locking the guide member against movement relative to the mounting bracket, and (b) an unlocked position permitting the guide member to rotate about the pivot axis and translate axially along the pivot axis relative to the mounting bracket. The lock is movable to the locked position when the step is in the retracted position to thereby fix the step in the retracted position by locking the guide member. The lock assembly also includes a release member that is constructed and arranged to move the lock from the locked position to the unlocked position, thereby allowing movement of the step between the retracted position and the extended position by movement of the guide member.

Another aspect of the invention provides a vehicle with a retractable step assembly mounted to an underside of the vehicle. The step assembly includes a mounting bracket for mounting the step assembly in an operative position to the vehicle, and a step pivotally connected to the mounting bracket so as to pivot about a substantially vertical pivot axis when the step assembly is in the operative position. The step has a top surface configured to receive a person's foot. The assembly also includes a guide member that is provided on the step and movably mounted to the mounting bracket to rotate about the pivot axis and translate axially along the pivot axis relative to the mounting bracket to allow the step to be moved between a retracted position and an extended position. A lock assembly is constructed and arranged to lock the guide member and the step in the retracted position. The lock assembly includes a lock movable between (a) a locked position locking the guide member against movement relative to the mounting bracket, and (b) an unlocked position permitting the guide member to rotate about the pivot axis and translate axially along the pivot axis relative to the mounting bracket. The lock is movable to the locked position when the step is in the retracted position to thereby fix the step in a respective position by locking the guide member. The lock assembly also includes a release member that is constructed and arranged to move the lock from the locked position to the unlocked position, thereby allowing movement of the step between the retracted position and the extended position by movement of the guide member.

These and other aspects of the invention will become apparent from the following detailed description when taken in conjunction with the accompanying drawings, which are part of this disclosure and which illustrate, by way of example, the principles of this invention.

BRIEF DESCRIPTION OF THE DRAWINGS

Features of the invention are shown in the drawings, in which like reference numerals designate like elements. The drawings form part of this original disclosure, in which.

DETAILED DESCRIPTION OF EMBODIMENTS OF THE INVENTION

Figure 1:
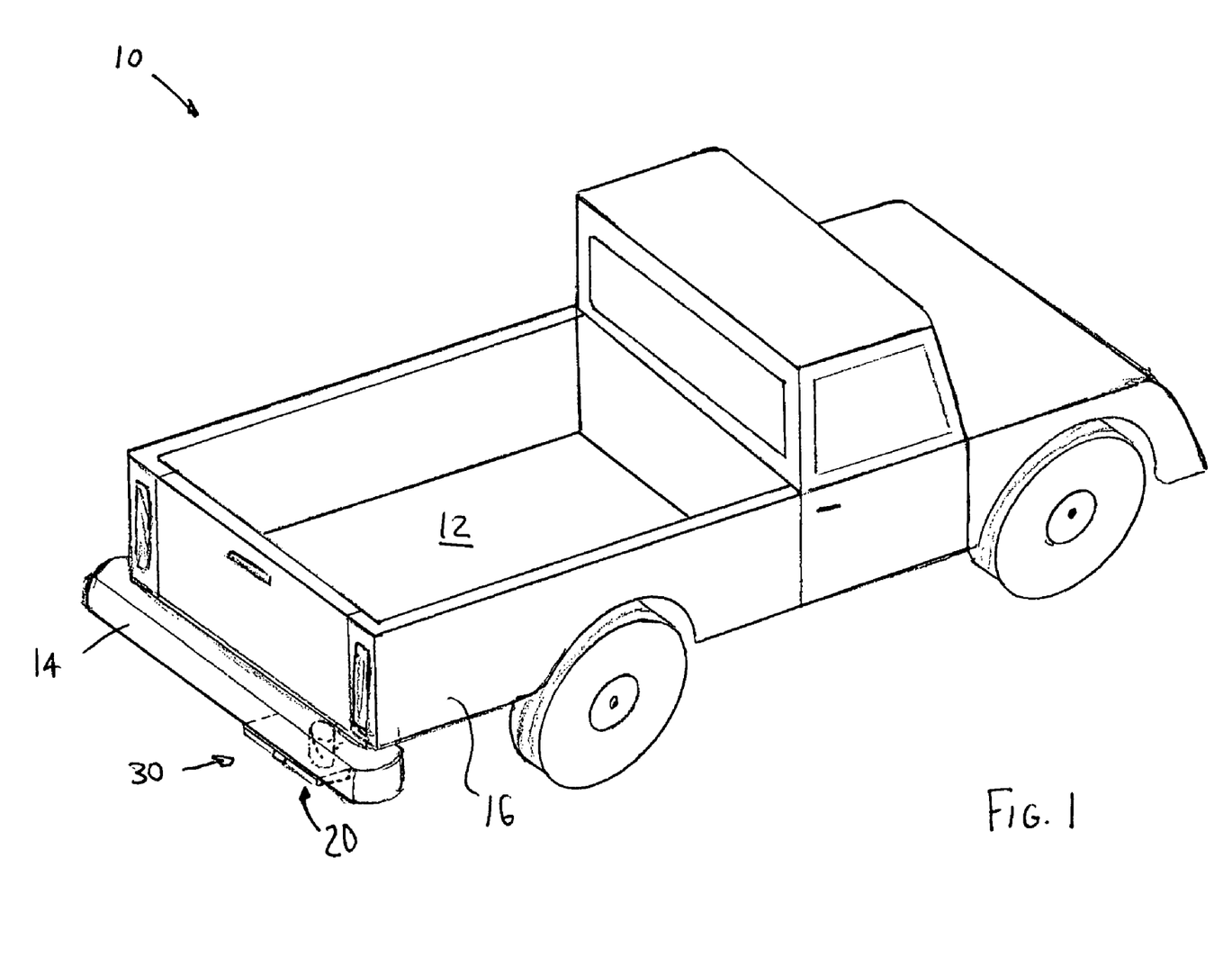
FIG. 1 is a perspective view of a vehicle with a retractable step assembly of the present invention, the step assembly being in a retracted position.
Figure 2:
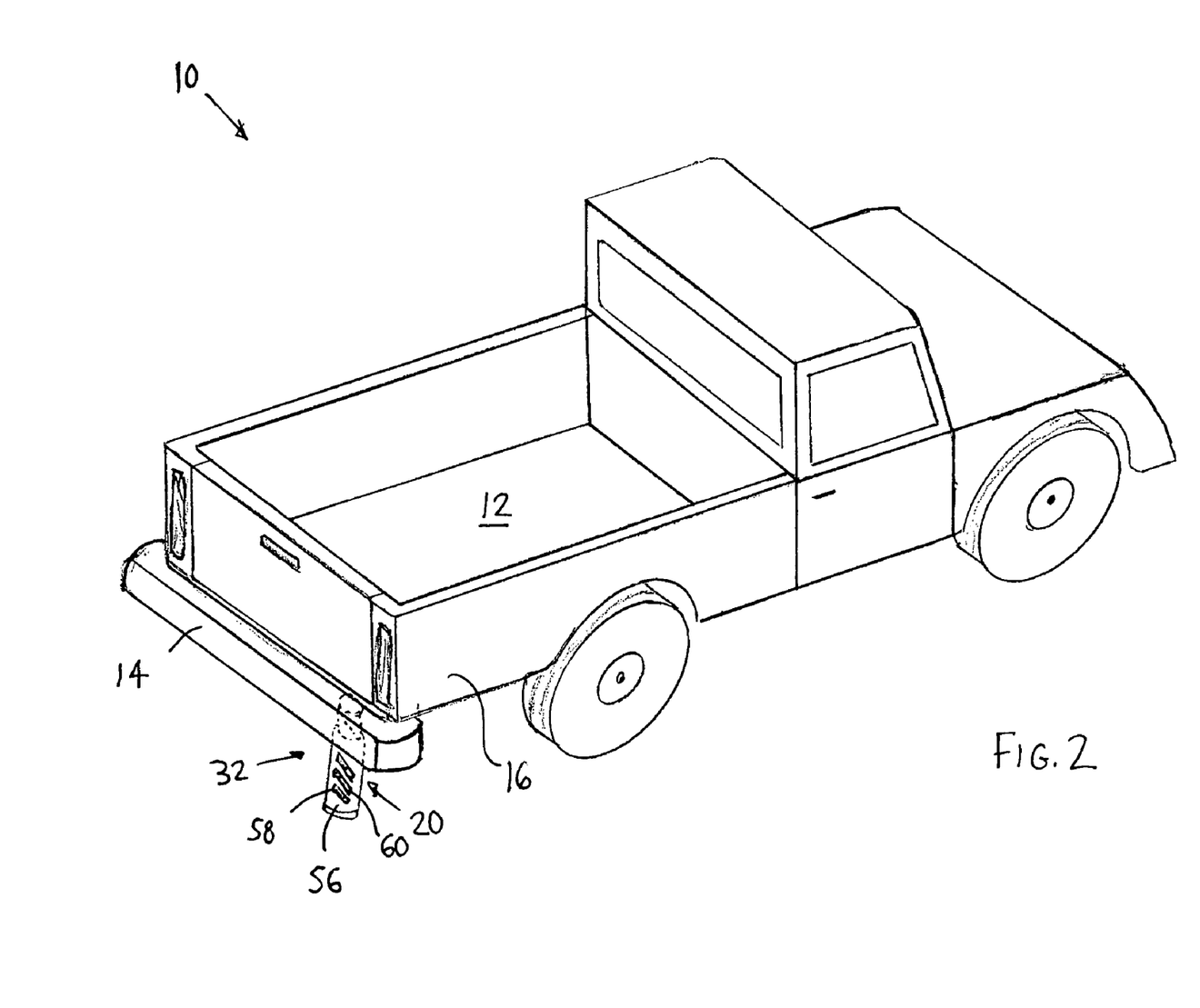
FIG. 2 is a perspective view of the vehicle of FIG. 1 with the retractable step assembly in an extended position.

FIG. 1 shows a vehicle 10 with a cargo box 12 and a retractable step assembly 20 mounted in an operative position to the vehicle 10. As shown, the vehicle is a "pick-up" truck, however, it is contemplated that the step assembly 20 may be mounted to any type of vehicle that may benefit from having a step that a person may step on. For example, the vehicle may be a sport utility vehicle ("SUV"), and the step assembly may be used to assist a person to access a roof rack on the SUV without having to step on the bumper, or open a door and step on the door frame. It is also contemplated that the step assembly 20 may also be mounted to industrial vehicles, such as delivery vans, cube vans, etc. The vehicle 10 illustrated in FIGS. 1 and 2 is not intended to be limiting in any way.

As shown in FIG. 1, the retractable step assembly 20 is mounted to the vehicle 10 so that the step assembly 20 may be stored in a retracted position 30 beneath, for example, a bumper 14 of the vehicle 10. As shown in FIG. 2, the step assembly 20 may be moved to an extended position 32 so that a person may step on the step assembly 20 and access items in the cargo box 12, even when a tailgate 16 of the vehicle 10 is in the down position (not shown). It is understood that the mounting location of the step assembly 20 that is illustrated in FIGS. 1 and 2 is just one contemplated location. For example, the step assembly 20 may also be mounted beneath a side panel 16 of the cargo box 12, or in any location with suitable space and mounting structure. The embodiment shown is not intended to be limiting in any way.

Figure 3:
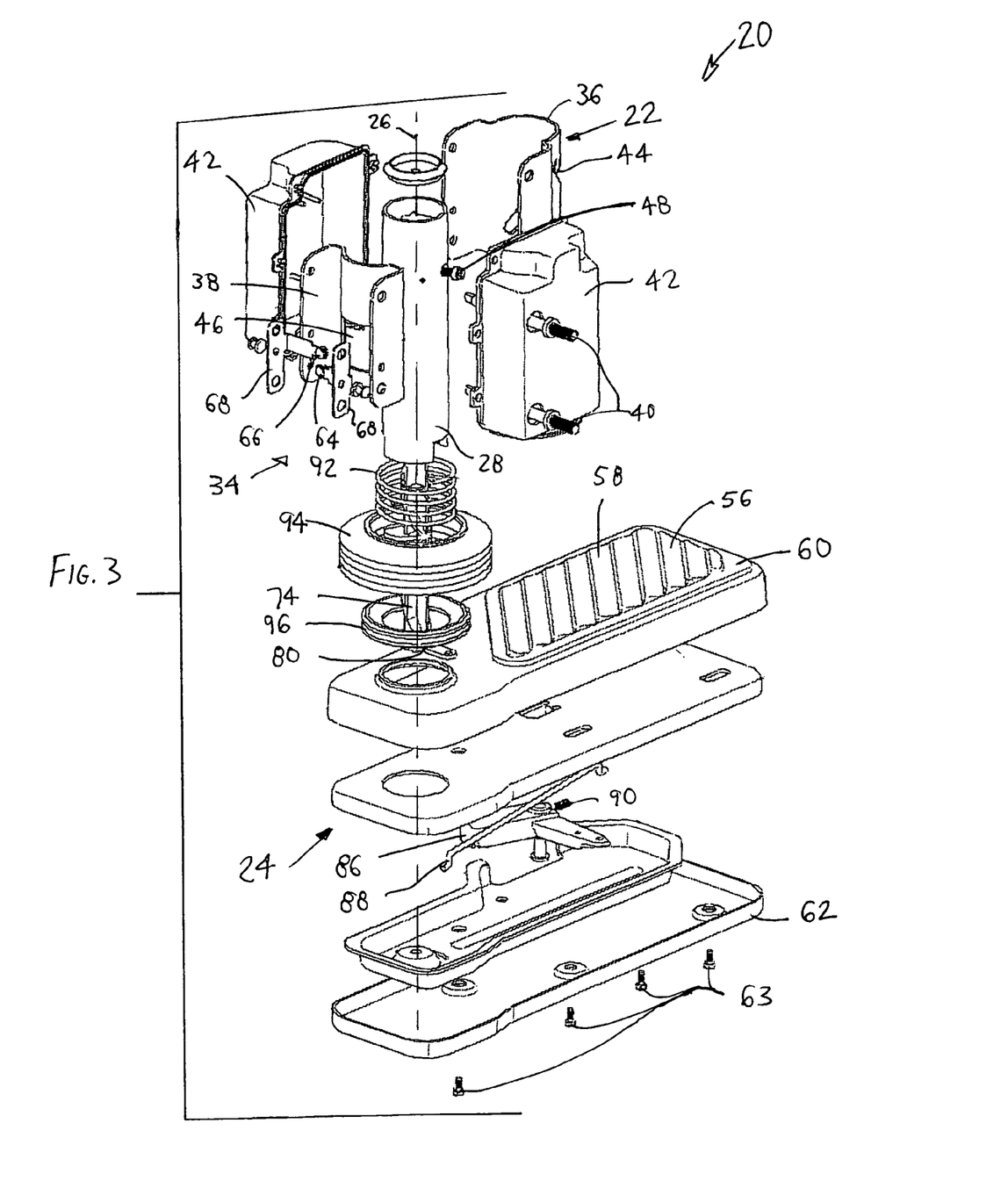
FIG. 3 is an exploded view of an embodiment of the step assembly of FIGS. 1 and 2.
Figure 4:
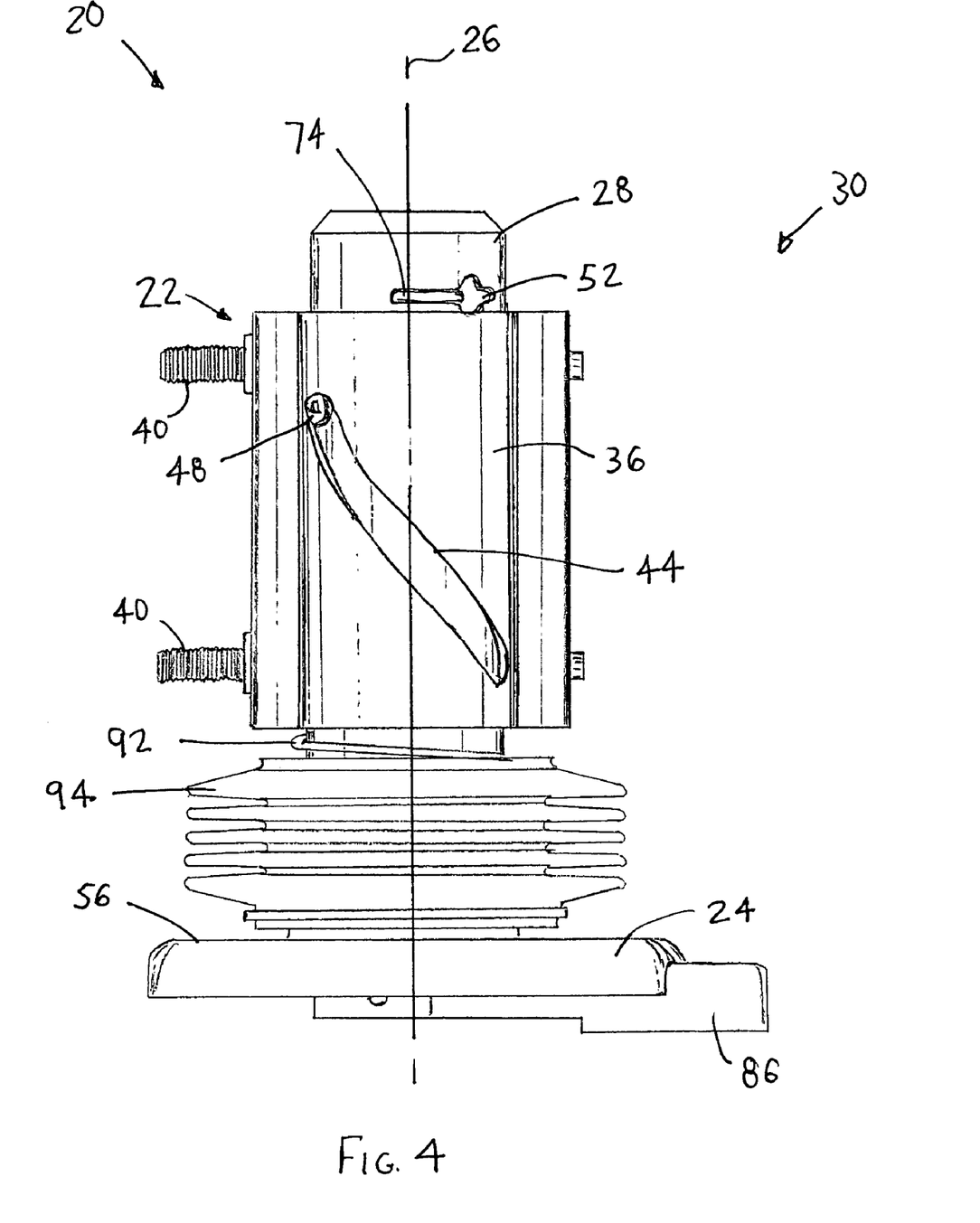
FIG. 4 is a left side view of the step assembly of FIG. 3 in the retracted position.
Figure 5:
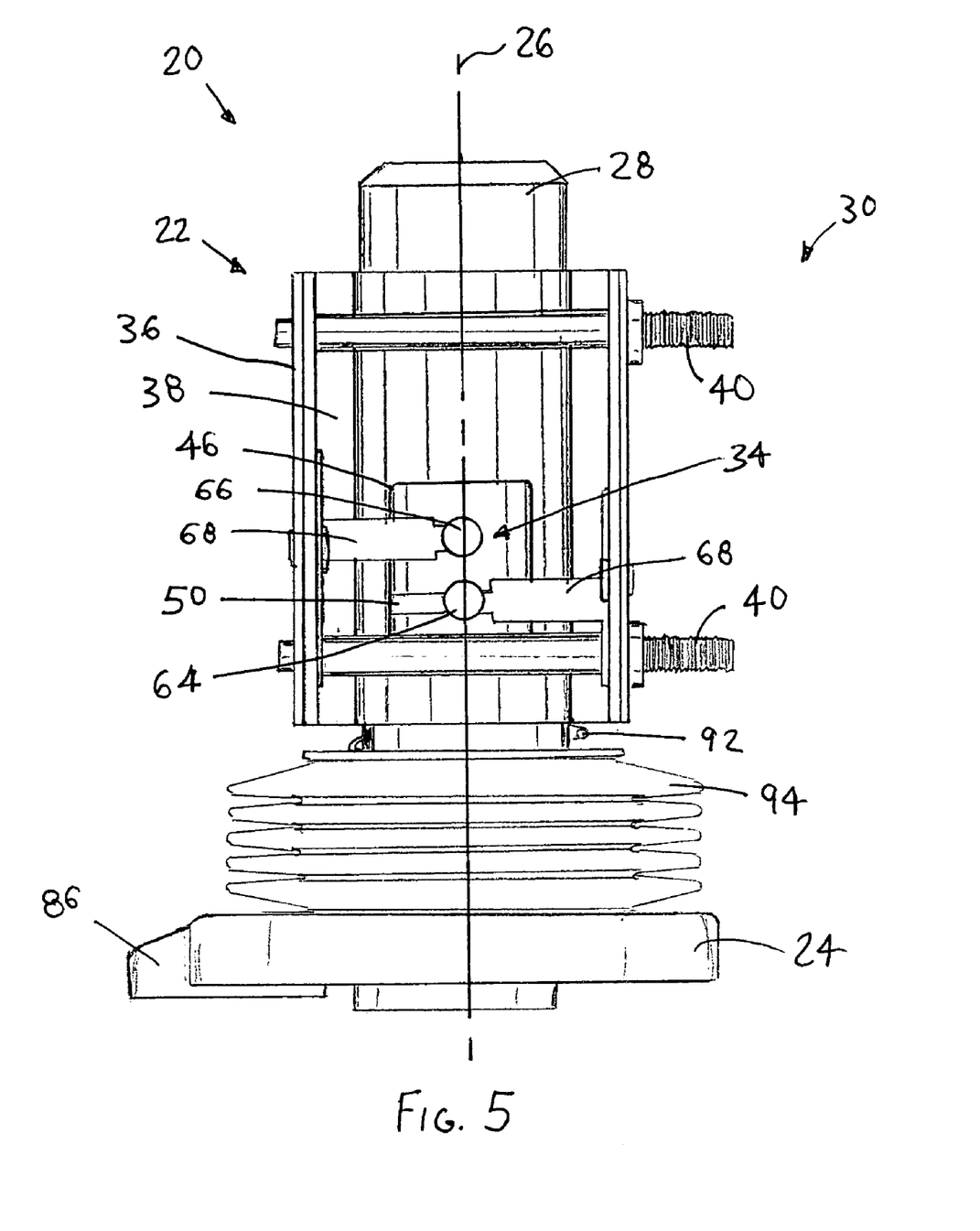
FIG. 5 is a right side view of the step assembly of FIG. 4.
Figure 6:
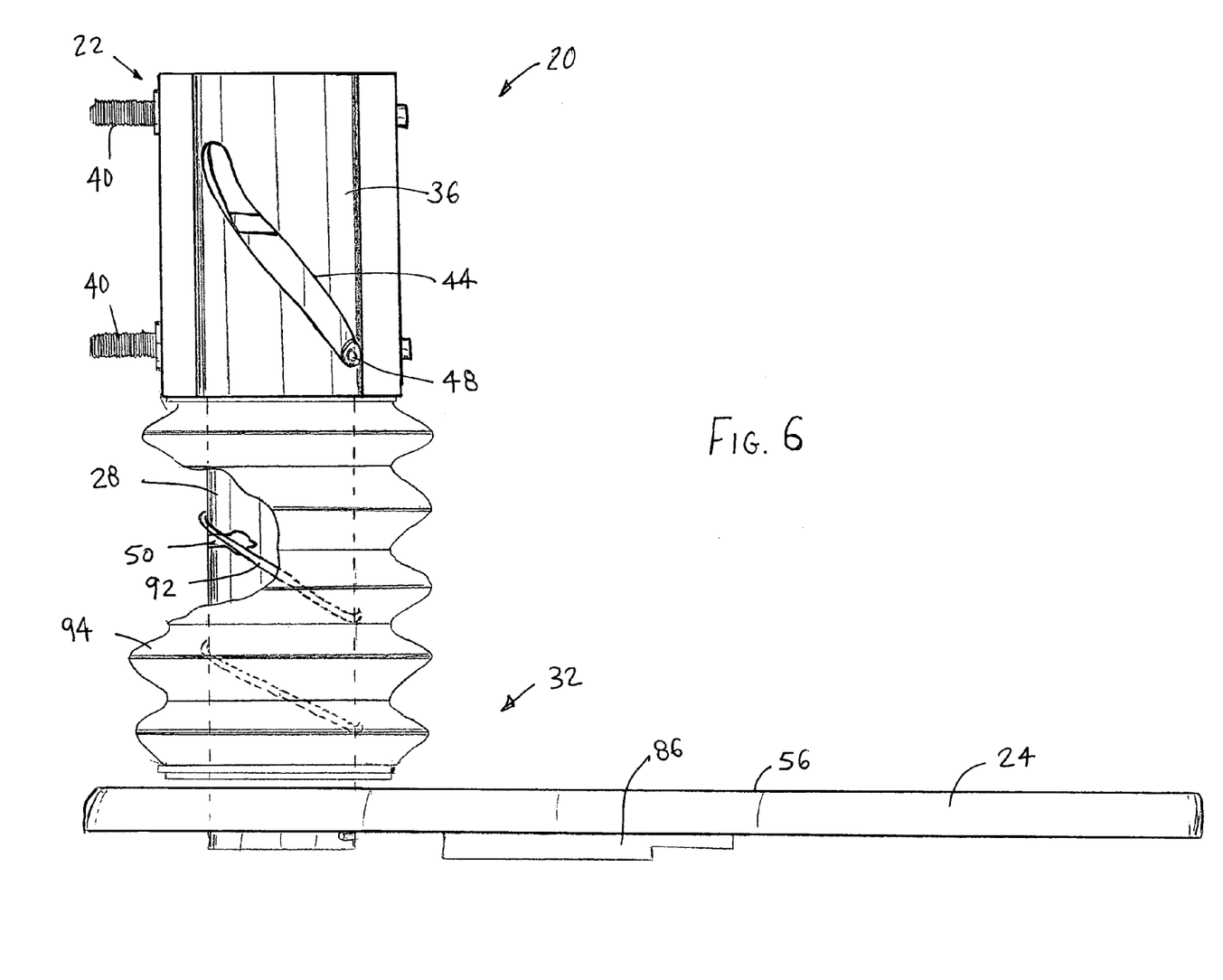
FIG. 6 is a left side view of the step assembly of FIG. 3 in the extended position.
Figure 7:
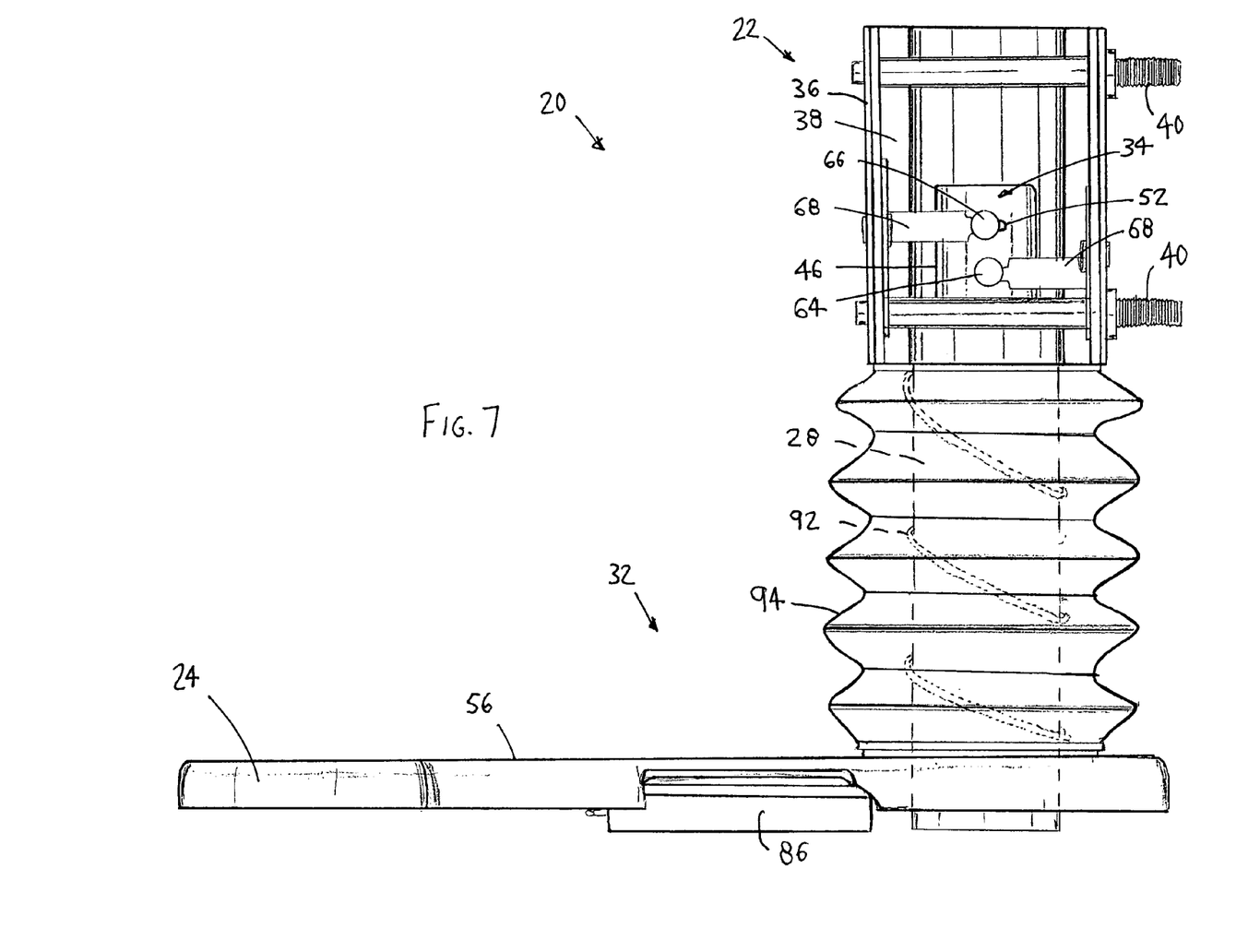
FIG. 7 is a right side view of the step assembly of FIG. 6.

FIG. 3 illustrates the details of the step assembly 20 when it is in the retracted position 30. The step assembly 20 includes a mounting bracket 22 for mounting the step assembly 20 in the operative position to the vehicle 10, a step 24 that is operatively connected to the mounting bracket 22 for pivotal movement about a substantially vertical pivot axis 26, and a guide member 28 that is movably mounted to the mounting bracket 22 and provided on the step 24. The guide member 28 is configured to rotate about the pivot axis 26 and translate axially along the pivot axis 26 relative to the mounting bracket 22 to allow the step 24 to be moved between the retracted position 30, shown in greater detail in FIGS. 4 and 5, and the extended position 32, shown in greater detail in FIGS. 6 and 7. A lock assembly 34 is also provided to lock the step 24 in at least the retracted position 30. The lock assembly 34 may also be configured to lock the step 24 in both the retracted position 30 and in the extended position 32.

The mounting bracket 22 includes a pair of mounting plates 36, 38 that are connectable upon assembly and are preferably held together with at least two bolts 40. The bolts 40 may also be used to bolt the entire step assembly 20 to the vehicle 10. Preferably, the mounting plates 36, 38 are shaped complementary to each other so that they surround the guide member 28, yet still allow the guide member 28 to freely move, as will be discussed in greater detail below. A cover 42 is also provided to protect the mounting bracket 22 and inner assembly from water and dirt once the assembly 20 is mounted to the vehicle 10. As shown, the cover 42 includes two parts that complement each other in a tongue and groove configuration. This configuration creates a seal once the cover 42 is attached to the mounting bracket 22, thereby protecting many of the inner parts of the assembly, including the guide member 28, from adverse environmental conditions. It is also contemplated that a gasket may be used instead of, or in addition to the tongue and groove configuration to seal the two parts together. The cover 42 may have any shape and the design illustrated is not intended to be limiting in any way.

As shown in the Figures, one of the mounting plates 36 includes a slot 44, while the other mounting plate 38 includes an opening 46. As will be discussed in further detail below, the slot 44 defines the movement of the guide member 28 relative to the mounting bracket 22. Preferably, the slot 44 is helical in shape, as shown in the Figures, with respect to the pivot axis 26, or at least partially follows a path that is helical with respect to the pivot axis 26. By providing such a shape, the guide member 28 is able to both rotate and translate relative to the mounting bracket 22. It is understood that the embodiment shown is in no way intended to be limiting and that the slot may be of any shape to affect the movement of the guide member 28 relative to the mounting bracket 22. The opening 46 in the other mounting plate 38 provides access to the guide member 28 by the lock assembly 34, as will be discussed in further detail below.

Figures 8, 9:
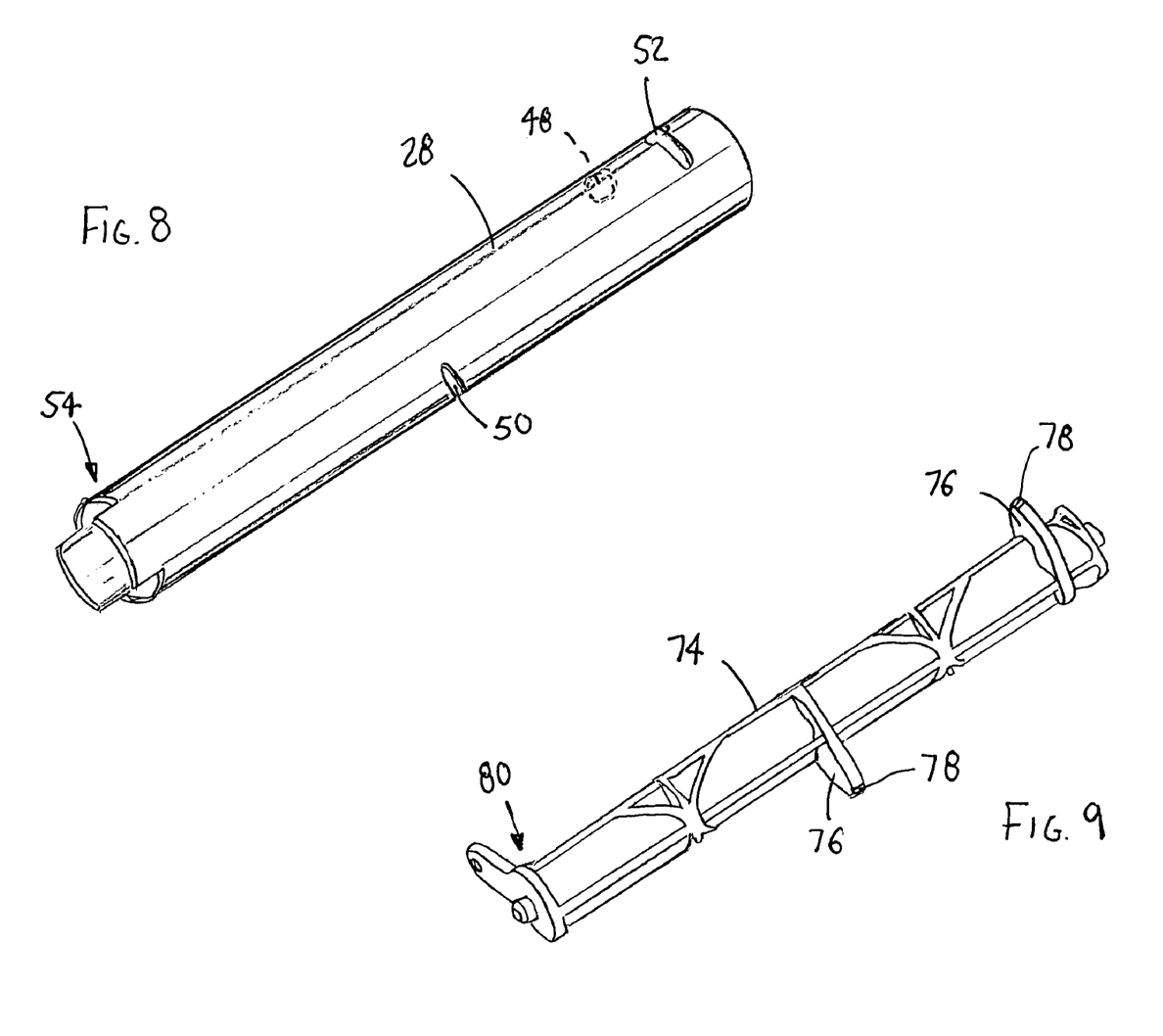
FIG. 8 is a perspective view of a guide member of the step assembly of FIG. 3.
FIG. 9 is a perspective view of a release member of the step assembly of FIG. 3.

The guide member 28 is shown in greater detail in FIG. 8. In the illustrated embodiment, the guide member 28 is preferably substantially tubular in shape and includes a guide pin 48 that interacts with the slot 44 in the mounting plate 36. This interaction controls the movement of the guide member 28 relative to the mounting bracket 22. That is, the guide pin 48 is designed to ride along the slot 44, thereby forcing the guide member 28 to rotate about the pivot axis 26 and to translate axially along the pivot axis 26. As discussed above, it is the shape of the slot 44 that will determine the movement of the guide member 28 and the partial helix shown in the Figures is not intended to be limiting in any way.

The guide member 28 includes a lower end 54 that is operatively connected to the step 24. Preferably, one end of the step 24 is fixedly connected to the lower end 54 of the guide member 28. It is also contemplated that a middle portion of the step 24 may be connected to the lower end 54 of the guide member 28, but for compactness of the assembly 20, it is preferable for the step 24 to be connected at one end. The step 24 and the guide member 28 are connected by known methods so that the step 24 moves with the guide member 28. For example, fasteners may be used to connect the step 24 to the guide member 28, or the step 24 and the guide member 28 may be welded to each other. By connecting the step 24 to the guide member 28, the step 24 will move with the guide member 28 as the guide member 28 pivots about the pivot axis 26 and translates axially along the pivot axis 26 relative to the mounting bracket 22.

Preferably, the slot 44 is arranged so that when the guide pin 48 is at one end of the slot 44, the step 24 is in the retracted position 30, and when the guide pin 48 is at the other end of the slot 44, the step 24 is in the extended position 32. In embodiments where the step assembly 20 is mounted to the vehicle 10 so that the step 24 is substantially parallel with the bumper 14 of the vehicle 10 when the step 24 is in the retracted position 30, as is shown in FIG. 1, the step 24 preferably rotates between about 45° and 150° when it moves between the retracted position 30 and the extended position 32, and vice-versa. More preferably, the step 24 rotates between about 90° and about 135° when it moves between the retracted position 30 and the extended position 32, and vice-versa. Most preferably, the step 24 rotates about 135° when it moves between the retracted position 30 and the extended position 32, and vice-versa. In addition to the rotation, the step 24 preferably translates vertically (i.e., axially along the substantially vertical pivot axis 26) about 1 inches to about 6 inches when it moves between the two positions 30, 32. More preferably, the step 24 translates vertically about 3 inches when it moves between the two positions 30, 32. Of course, the rotation and the translation of the step 24 may be altered to any angle and distance, respectively, by changing the length or shape of the slot 44.

As shown in FIG. 8, the guide member 28 also includes two locking slots, including a first locking slot 50 and a second locking slot 52, that are positioned to interact with the lock assembly 34, which is discussed in further detail below. The locking slots 50, 52 are preferably arranged so that they are spaced from one another in both an axial direction and in a radial direction with respect to the pivot axis 26. The positioning of the first and second locking slots 50, 52 allows for the step 24 to be locked in both the retracted position 30, as well as the extended position 32, which will be discussed in further detail below. Of course, in embodiments that provide for the locking of the step 24 in only the retracted position 30, only one of the locking slots, e.g. the first locking slot 50, is needed.

Returning to FIG. 3, the step 24 includes a top surface 56 that may include texturing 58. Because the top surface 56 is designed to receive a person's foot, the texturing 58 may provide additional traction, especially in the event that the step 24 becomes wet. The step 24 is preferably sized large enough to receive at least one foot, yet small enough so that the step 24 fits below the bumper 14 of the vehicle 10, as shown in FIG. 1. The top surface 56 of the step 24 may also include a non-metal portion 60 that is also designed to improve the traction between the person's foot and the step 24. The non-metal portion 60 may include rubber, plastic, or any synthetic material that is commonly used on vehicle bumpers and the like. Preferably, the non-metal portion 60 is a plastic material, such as thermoplastic olefin elastomer (TPO). The non-metal portion 60 may also include the texturing 58. The step may include a plurality of components, including a bottom cover 62 that may be attached to a piece that defines the top surface 56, by known methods, such as with fasteners 63.

As shown in FIG. 3, the step assembly 20 also includes a lock assembly 34 that is constructed and arranged to lock the guide member 28 and the step 24 both in the retracted position 30 and in the extended position 32. Of course, it is understood that the lock assembly 34 may be constructed and arranged to lock the guide member 28 and the step 24 in only the retracted position 30. The lock assembly 34 includes at least one lock that is operatively connected to the mounting bracket 22 and configured to lock the guide member 28 when the step 24 is both in the retracted position 30 and in the extended position 32. In embodiment where the lock assembly 34 is constructed and arranged to lock the guide member 28 and the step 24 in only the retracted position 30, only one lock may be needed.

In the illustrated embodiment, the lock assembly 34 includes a first lock 64 and a second lock 66. The first and second locks 64, 66 may be mounted to the mounting bracket 22 via lock mounting tabs 68. As shown, the lock mounting tabs 68 are mounted on the mounting plate 38 such that the locks 64, 66 are able to extend inwardly through the opening 46 in the mounting plate 38 and into the appropriate locking slot 50, 52 in the guide member 28. For example, the first lock 64 and the first locking slot 50 are positioned such that when the guide pin 48 is at the top of the slot 44, and the step 24 is in the retracted position 30, the first lock 64 engages the first locking slot 50. Because the mounting tabs 68 bias the locks 64, 66 towards the guide member 28, the first lock 64 will automatically engage the first locking slot 50 when the two are aligned with one another. The first lock 64 and the first locking slot 50 are designed to securely lock the guide member 28 in place. The first lock 64 may be disengaged from the first locking slot 50 when the first lock 64 is moved against the bias of the mounting tab 68 in a manner discussed below. Similarly, the second lock 66 and the second locking slot 52 are positioned such that when the guide pin 48 is at the bottom of the slot 44, and the step 24 is in the extended position 32, the second lock 66 engages the second locking slot 52 in the same manner as described in regard to the first lock 64 and the first locking slot 50. Like the first lock 64, the second lock 66 may be disengaged from the second locking slot 52 when the second lock 66 is moved against the bias of the mounting tab 68 in a manner discussed below. It is contemplated that only one lock, e.g. the first lock 64, may be used to lock the step 24 in both the retracted position 30 and in the extended position 32. In such an embodiment, the location of the locking slots 50, 52 in the guide member 28 may be positioned so that the same lock may be used to engage each slot 50, 52 when the step 24 is in the respective position 30, 32.

The lock assembly 34 also includes a release member 74, shown in greater detail in FIG. 9, that is preferably disposed along the pivot axis 26 within the guide member 28. The release member 74 includes at least one protrusion 76 with an engaging surface 78 that is configured to engage at least one of the locks 64, 66 when the release member 74 is rotated from a first position to a second position. As shown, the release member 74 preferably includes at least two protrusions 76 that are arranged in a complementary configuration with the two locking slots 50, 52 of the guide member 28. The protrusions 76 are designed to rotate through the locking slots 50, 52 on a constant diameter, such that when the release member 74 is rotated from the first position to the second position, the protrusions 76 enter and extend through the locking slots 50, 52, thereby moving anything that has entered the locking slots 50, 52 out of the locking slots 50, 52. In the illustrated embodiment, the protrusions 76 are arranged to enable the engaging surface 78 to engage whichever lock 64, 66 that is engaged with the corresponding locking slot 50, 52 of the guide member 28, and move the lock 64, 66 out of the locking slot 50, 52 against the bias of the mounting tabs 68. With this configuration, the same motion of the release member 74 may be used to unlock either of the locks 64, 66. It is understood that the design of the release member 74 that is illustrated is not intended to be limiting in any way. The release member 74 is preferably molded out of a plastic material, such as nylon or polypropylene, and may include a filler, such as glass or carbon, to strengthen the release member 74. It is understood, however, that the release member 74 may be manufactured from any material, and the described embodiment is not intended to be limiting in any way.

Figure 10:
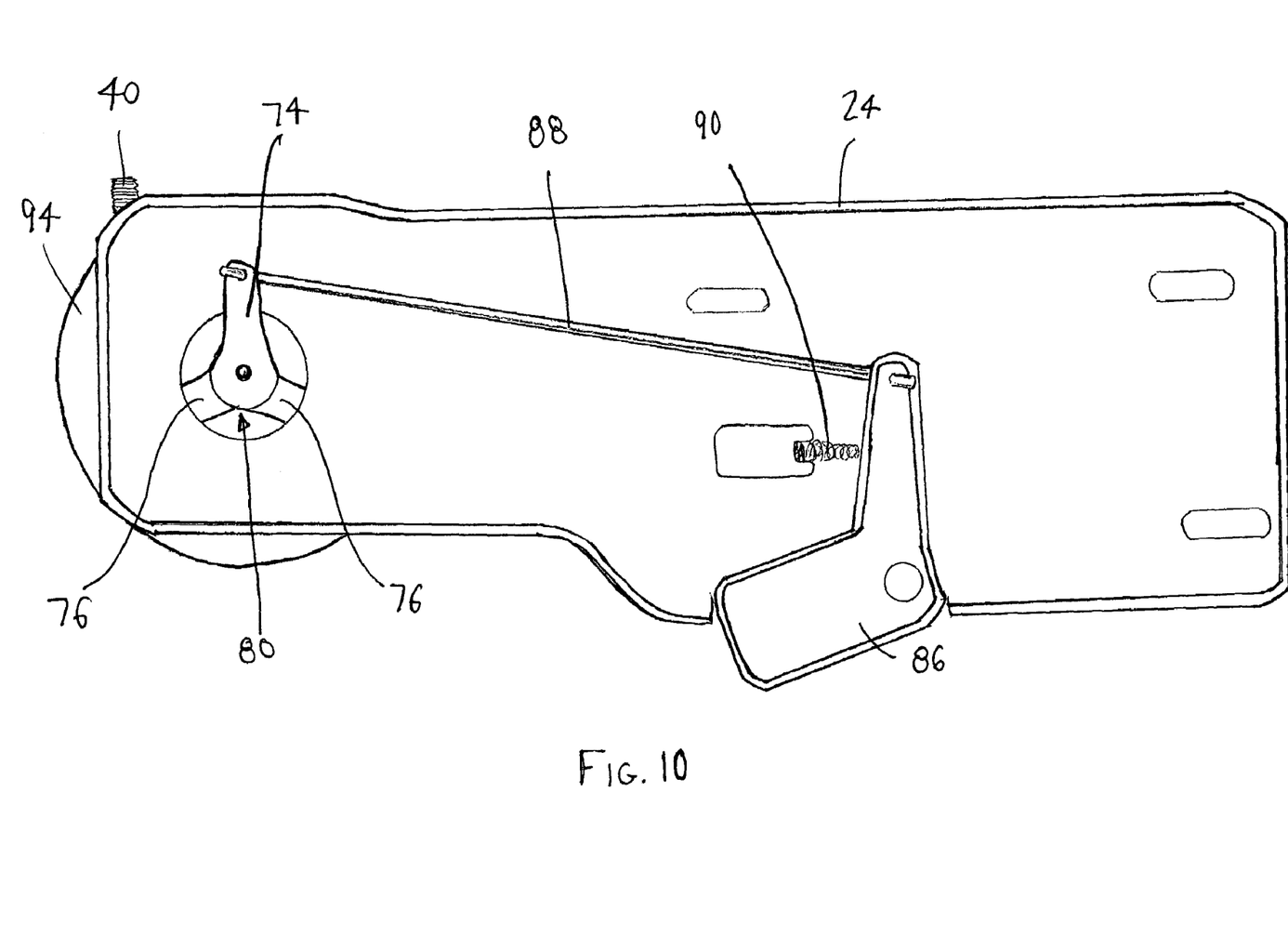
FIG. 10 is a bottom view of the step assembly of FIG. 3, with a bottom cover removed.

The release member 74 has a lower end 80 that is operatively connected to an actuator 86. As shown in FIG. 10, the actuator 86 may be disposed within the step 24, and may be connected to the lower end 80 of the release member 74 via a connecting rod 88. Preferably, the actuator 86 is biased by a spring 90 such that the release member 74 is biased in the first position. That is, the release member 74 may be rotated to the second position upon actuation of the actuator 86, but when the actuator 86 is released, the spring 90 will bias the actuator 86 back to its initial position, thereby causing the release member 74 to rotate back to the first position.

When the user would like to unlock the step 24 and move the step 24 either from the retracted position 30 to the extended position 32, or vice-versa, the user may actuate the actuator 86, which causes the appropriate engaging surface 78 to engage one of the locks 64, 66 and push the lock 64, 66 out of the corresponding locking slot 50, 52. This in turn unlocks the guide member 28 and allows the guide pin 48 to move from one end of the slot 44 to the opposite end of the slot 44. As long as the actuator 86 has been released by the user, the other lock 64, 66 is able to engage the other locking slot 50, 52 on the guide member 28 and lock the guide member 28 and the step 24 in the other position 30, 32. The engaging surface 78 of the protrusion 76 is designed such that the spring 90 will not bias the actuator 86 back to the home position until the lock 64, 66 has been moved out of the respective locking slot 50, 52.

The step assembly 20 may also include a spring 92 that is disposed around the guide member 28 and is configured to bias the step 24 downward, and away from the mounting bracket 22. Because of the bias of the spring 92, the step 24 may be easily deployed, i.e., moved from the retracted position 30 to the extended position 32, than it would be from relying solely on gravity. Preferably, one end of the spring 92 is attached to the step 24 and the opposite end of the spring 92 is attached to the cover 42. As shown in the Figures, the assembly 20 also includes a flexible cover 94, or bellows, that covers the spring 92 and the exposed surface of the guide member 28 to keep dirt and water out of the inner portions of the assembly. The flexible cover 94 is also preferably operatively connected to the step 24 at one end, and to the mounting bracket cover 42 at the opposite end so that it expands when the step 24 is moved from the retracted position 30 to the extended position 32. The flexible cover 94 is operatively connected so that a seal is provided at the step 24 and at the mounting bracket cover 42, yet the flexible cover 94 is allowed to freely rotate so that it does not twist or bind when the step 24 rotates. The seals at each end of the flexible cover 94 allow the guide member 28 and the spring 92 to be protected from adverse environmental conditions. A ring 96 may be used to assist in providing the proper seal between the flexible cover 94 and the step 24. The flexible cover 94 is preferably made from a rubber or flexible plastic material that may withstand repetitive cycling between the two positions 30, 32. It is also contemplated that a damper (not shown) may also be provided in place of or in addition to the spring 92 to provide a more controlled movement of the step 24 as it moves from the retracted position 30 to the extended position 32.

In operation, the step assembly 20 is mounted to the vehicle 10 at a location in which the user would like the benefit of a step assist. Preferably, the step assembly 20 is mounted beneath the rear bumper 14 of the vehicle 10, or under the side panel 16 of the vehicle. The bolts 40 provided on the assembly 20 may be used to mount the assembly 20 to an appropriate structure on the vehicle 10 by known methods.

When the user wants to deploy the step 24, the user may actuate the actuator 86. This movement of the actuator 86 causes the release member 74 to rotate from the first position to the second position, which causes the engaging surface 78 to engage the first lock 64 and push the first lock 64 out of the first locking slot 50 in the guide member 28. The energy stored in the spring 92 provides a force, in addition to the gravitational force acting on the step 24 and the guide member 28, that moves the step 24 from the retracted position 30 to the extended position 32, as the guide pin 48 moves along the slot 44 in the mounting plate 36. When the guide pin 48 reaches the lower end of the slot 44, the second lock 66, if included in the step assembly 20, engages the second locking slot 52 in the guide member 28, thereby locking the step 24 in the extended position 32. The user is now able to step on the step 24 and access the desired part of the vehicle 10.

To stow the step 24 in the retracted position 30, the user may push the actuator 86, which causes the release member 74 to rotate from the first position to the second position. This rotation causes the engaging surface 78 to push the second lock 66 out of the second locking slot 52. In the illustrated embodiment, the user is required to move the step 24 against the bias of the spring 92 in order to return the step 24 to the retracted position 30. Once the guide pin 48 returns to the upper end of the slot 44, the first lock 64 is able to reengage the first locking slot 50 of the guide member 28 so as to lock the step 24 in the retracted position 30. The actuator 86 will then move back to the biased position, and is ready to be pushed by the user to redeploy the step 24 to the extended position 32.

It is also contemplated that motors may be included in the assembly 20 to provide the power to move the respective movable parts of the assembly 20 and still be within the scope of the present invention. For example, a motor may be used to rotate the release member 74, rather than the mechanical linkage of the connecting rod 88 and the actuator 86. Also, the guide member 28 may be a worm gear that is driven by a motor. In such an embodiment, the spring 92 would not be needed and the worm gear may be used to lock the step 24 in the two positions 30, 32. In such a configuration, the user would merely press a button to either deploy the step 24 to the extended position 32, or to return the step 24 to the retracted position 30.

While preferred embodiments of the invention have been shown and described, it is evident that variations and modifications are possible that are within the spirit and scope of the preferred embodiments described herein. The disclosed embodiments have been provided solely to illustrate the principles of the invention and should not be considered limiting in any way.

What is claimed is:

1. A retractable step assembly for use with a vehicle, the step assembly comprising:
 a mounting bracket for mounting the step assembly in an operative position to the vehicle;
 a step pivotally connected to the mounting bracket so as to pivot about a substantially vertical pivot axis when the step assembly is in the operative position, the step having a top surface configured to receive a person's foot;
 a guide member provided on the step and being movably mounted to the mounting bracket to rotate about the pivot axis and translate axially along the pivot axis relative to the mounting bracket to allow the step to be moved between (a) an extended position wherein the step extends outward from the vehicle, and (b) a retracted position wherein the step is pivoted inwardly and raised vertically from the extended position;
 a lock assembly constructed and arranged to lock the guide member and the step in the retracted position, the lock assembly comprising
  a lock movable between (a) a locked position locking the guide member against movement relative to the mounting bracket, and (b) an unlocked position permitting the guide member to rotate about the pivot axis and translate axially along the pivot axis relative to the mounting bracket, the lock being movable to the locked position when the step is in the retracted position to thereby fix the step in the retracted position by locking the guide member; and
  a release member constructed and arranged to move the lock from the locked position to the unlocked position, thereby allowing movement of the step between the retracted position and the extended position by movement of the guide member.

2. A retractable step assembly according to claim 1, wherein the lock assembly is further constructed and arranged to lock the guide member and the step in the extended position, the lock being movable to the locked position when the step is in the extended position to thereby fix the step in the extended position by locking the guide member.

3. A retractable step assembly according to claim 1, wherein the lock is a first lock and the lock assembly further comprises a second lock, the second lock being movable between (a) a locked position locking the guide member against movement relative to the mounting bracket, and (b) an unlocked position permitting the guide member to rotate about the pivot axis and translate axially along the pivot axis relative to the mounting bracket, the second lock being movable to the locked position when the step is in the extended position to thereby fix the step in the extended position by locking the guide member.

4. A retractable step assembly according to claim 3, wherein the first lock is in the unlocked position when the step is in the extended position, and the second lock is in the unlocked position when the step is in the retracted position.

5. A retractable step assembly according to claim 3, wherein the guide member comprises a first locking slot constructed and arranged to receive the first lock when the step is in the retracted position, thereby locking the guide member to fix the step in the retracted position, and a second locking slot constructed and arranged to receive the second lock when the step is in the extended position, thereby locking the guide member to fix the step in the extended position.

6. A retractable step assembly according to claim 5, wherein the guide member is substantially tubular in shape and the release member is disposed within the guide member, the release member comprising one or more engaging surfaces constructed and arranged to extend through the locking slots and move the locks from the locked position to the unlocked position.

7. A retractable step assembly according to claim 6, further comprising an actuator constructed and arranged to affect rotation of the release member when the actuator is actuated so that the engaging surface engages one of the locks and pushes the lock out of the locking slot, thereby unlocking the lock and allowing the guide member and step to rotate from the retracted position to the extended position, or vice-versa.

8. A retractable step assembly according to claim 1, further comprising a spring that biases the step toward the extended position.

9. A retractable step assembly according to claim 1, wherein the lock is biased toward the locked position.

10. A retractable step assembly according to claim 1, wherein the guide member comprises a guide pin and the mounting bracket comprises a slot that receives the guide pin and controls the motion of the guide member.

11. A retractable step assembly according to claim 10, wherein the slot is a partial helix in shape.

12. A retractable step assembly according to claim 1, wherein the step rotates between about 45° and about 150° when the step moves between the retracted position and the extended position.

13. A retractable step assembly according to claim 12, wherein the step rotates about 135° when the step moves between the retracted position and the extended position.

14. A retractable step assembly according to claim 1, wherein the step translates axially about 1 inch to about 4 inches along the pivot axis when the step moves between the retracted position and the extended position.

15. A retractable step assembly according to claim 14, wherein the step translates axially about 3 inches along the pivot axis when the step moves between the retracted position and the extended position.

16. A retractable step assembly according to claim 1, wherein the mounting bracket is configured to be mounted so that the step is stored under a bumper of the vehicle when the step is in the retracted position.

17. A retractable step assembly according to claim 1, wherein the top surface of the step comprises plastic.

18. A retractable step assembly according to claim 1, wherein the top surface of the step comprises texturing.

19. A retractable step assembly according to claim 1, further comprising a cover for covering the mounting bracket and lock assembly, and a flexible cover for covering the guide member when the step is moved to the extended position, the cover and flexible cover being configured to protect internal components of the step assembly from the environment.

20. A vehicle with a retractable step assembly mounted to an underside of the vehicle, wherein the step assembly comprises:
 a mounting bracket for mounting the step assembly in an operative position to the vehicle;
 a step pivotally connected to the mounting bracket so as to pivot about a substantially vertical pivot axis when the step assembly is in the operative position, the step having a top surface configured to receive a person's foot;

a guide member provided on the step and being movably mounted to the mounting bracket to rotate about the pivot axis and translate axially along the pivot axis relative to the mounting bracket to allow the step to be moved between (a) an extended position wherein the step extends outward from the vehicle, and (b) a retracted position wherein the step is pivoted inwardly and raised vertically from the extended position;

a lock assembly constructed and arranged to lock the guide member and the step in the retracted position, the lock assembly comprising a lock movable between (a) a locked position locking the guide member against movement relative to the mounting bracket, and (b) an unlocked position permitting the guide member to rotate about the pivot axis and translate axially along the pivot axis relative to the mounting bracket, the lock being movable to the locked position when the step is in the retracted position to thereby fix the step in the retracted position by locking the guide member; and a release member constructed and arranged to move the lock from the locked position to the unlocked position, thereby allowing movement of the step between the retracted position and the extended position by movement of the guide member.

21. A vehicle according to claim 20, wherein the lock assembly is further constructed and arranged to lock the guide member and the step in the extended position, the lock being movable to the locked position when the step is in the extended position to thereby fix the step in the extended position by locking the guide member.

22. A vehicle according to claim 20, wherein the lock is a first lock and the lock assembly further comprises a second lock, the second lock being movable between (a) a locked position locking the guide member against movement relative to the mounting bracket, and (b) an unlocked position permitting the guide member to rotate about the pivot axis and translate axially along the pivot axis relative to the mounting bracket, the second lock being movable to the locked position when the step is in the extended position to thereby fix the step in the extended position by locking the guide member.

23. A vehicle according to claim 22, wherein the first lock is in the unlocked position when the step is in the extended position, and the second lock is in the unlocked position when the step is in the retracted position.

24. A vehicle according to claim 22, wherein the guide member comprises a first locking slot constructed and arranged to receive the first lock when the step is in the retracted position, thereby locking the guide member to fix the step in the retracted position, and a second locking slot constructed and arranged to receive the second lock when the step is in the extended position, thereby locking the guide member to fix the step in the extended position.

25. A vehicle according to claim 24, wherein the guide member is substantially tubular in shape and the release member is disposed within the guide member, the release member comprising one or more engaging surfaces constructed and arranged to extend through the locking slots and move any engaged lock from the locked position to the unlocked position.

26. A vehicle according to claim 25, the step assembly further comprising an actuator constructed and arranged to affect rotation of the release member when the actuator is actuated so that the engaging surface engages one of the locks and pushes the lock out of the locking slot, thereby unlocking the lock and allowing the guide member and step to rotate from the retracted position to the extended position, or vice-versa.

27. A vehicle according to claim 20, the step assembly further comprising a spring that biases the step toward the extended position.

28. A vehicle according to claim 20, wherein the lock is biased toward the locked position.

29. A vehicle according to claim 20, wherein the guide member comprises a guide pin and the mounting bracket comprises a slot that receives the guide pin and controls the motion of the guide member.

30. A vehicle according to claim 29, wherein the slot is a partial helix in shape.

31. A vehicle according to claim 20, wherein the step rotates between about 45° and about 150° when the step moves between the retracted position and the extended position.

32. A vehicle according to claim 31, wherein the step rotates about 135° when the step moves between the retracted position and the extended position.

33. A vehicle according to claim 20, wherein the step translates axially between about 1 inch and about 4 inches when the step moves between the retracted position and the extended position.

34. A vehicle according to claim 33, wherein the step translates about 3 inches vertically when the step moves between the retracted position and the extended position.

35. A vehicle according to claim 20, wherein the mounting bracket is configured to be mounted so that the step is stored under a bumper of the vehicle when the step is in the retracted position.

36. A vehicle according to claim 20, wherein the top surface of the step comprises plastic.

37. A vehicle according to claim 20, wherein the top surface of the step comprises texturing.

38. A vehicle according to claim 20, wherein the step assembly further comprises a cover for covering the mounting bracket and lock assembly, and a flexible cover for covering the guide member when the step is moved to the extended position, the cover and flexible cover being configured to protect internal components of the step assembly from the environment.

* * * * *